Dec. 29, 1970 H. STOPPER 3,551,827
T-FLIP-FLOP COMPOSED OF LOGIC CIRCUITS
Filed July 31, 1968 3 Sheets-Sheet 1
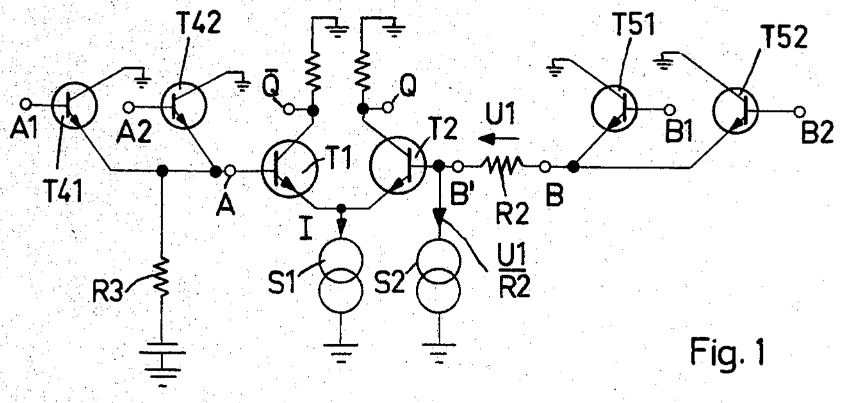
Fig. 1
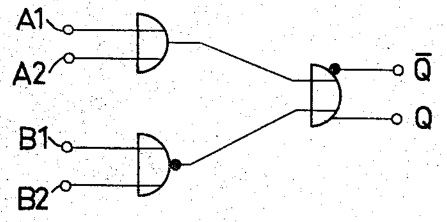
Fig. 2a
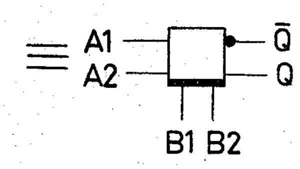
Fig. 2b
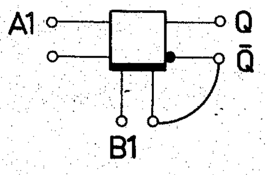
Fig. 3a
| A1 | B1 | $Q_{t+1}$ |
|---|---|---|
| 0 | 0 | $Q_t$ |
| 0 | 1 | 0 |
| 1 | 0 | 1 |
| 1 | 1 | 1 |
Fig. 3b
*INVENTOR*
Herbert Stopper
BY Spencer & Kaye
*ATTORNEYS*

INVENTOR
Herbert Stopper
BY Spencer & Kaye
ATTORNEYS

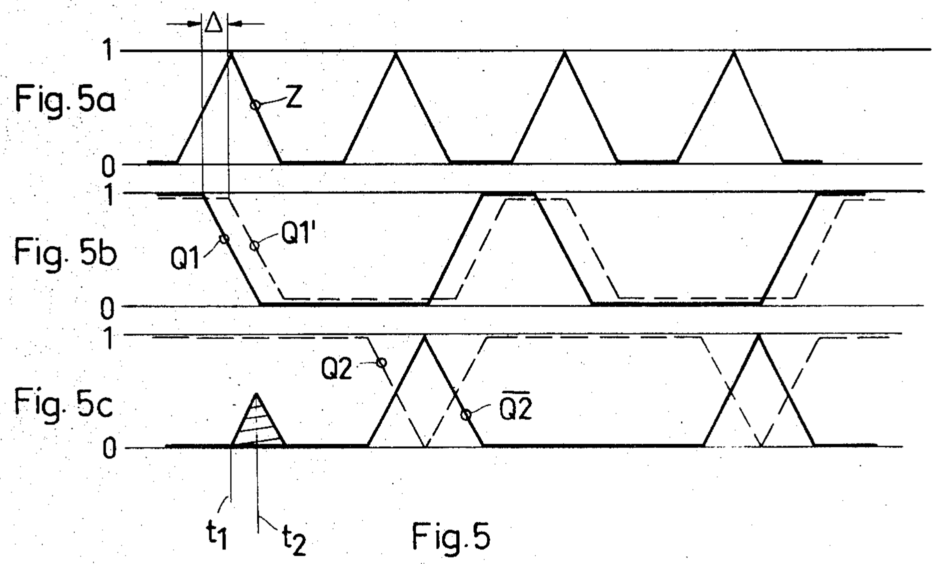
Fig. 5a, Fig. 5b, Fig. 5c, Fig. 5
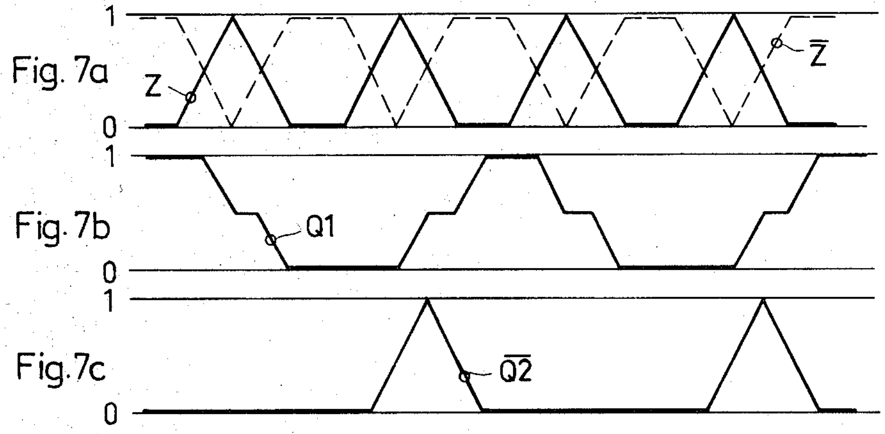
Fig. 7a, Fig. 7b, Fig. 7c
Fig. 7
INVENTOR
Herbert Stopper
BY Spencer & Kaye
ATTORNEYS United States Patent Office 3,551,827
Patented Dec. 29, 1970

3,551,827

T-FLIP-FLOP COMPOSED OF LOGIC CIRCUITS

Herbert Stopper, Litzelstetten, Germany, assignor to Telefunken Patentverwertungsgesellschaft m.b.H., Ulm (Danube), Germany Filed July 31, 1968, Ser. No. 749,100
Claims priority, application Germany, Aug. 1, 1967, 1,537,463
Int. Cl. H03k 3/12, 3/286, 23/08
U.S. Cl. 328—206 7 Claims

ABSTRACT OF THE DISCLOSURE

A T-flip-flop composed of a first stage having at least one direct input, one negated input, one direct output and one negated output, an AND-circuit having one input connected to the direct output of the first stage and its output connected to present the direct input to the first stage, and means for applying a train of counting pulses to one negated input of the first stage and the second input of the AND-circuit, the negated output of the first stage being directly connected to one negated input thereof, a signal appearing at the direct output of the first stage whenever a signal is applied to one direct input thereof and a signal appearing at the negated output of the first stage whenever a signal is applied to one of its negated inputs and no signal is applied to any of its direct inputs, whereby the output of the AND-circuit presents a pulse in response to every other counting pulse.

BACKGROUND OF THE INVENTION

My copending U.S. application Ser. No. 650,300, filed on June 20, 1967, which corresponds with my German Pat. No. 1,246,027, discloses a logic circuit consisting of two emitter-coupled transistors and having, despite its reduced fabrication cost, the capability of performing several important logic functions. This circuit is illustrated in FIG. 1 of the drawings and consists of two transistors T1 and T2 whose collectors are both connected to ground via identical load resistors and whose emitters are connected together and connected, via a constant current source S1, also to ground. Both transistors are controlled by logic signals A and B in such a manner that, except for the intervals during which switching occurs, either transistor T1 or transistor T2 becomes conductive while the other transistor becomes or remains blocked.

Whereas the voltage of the variable logic signal A is applied directly to the base of transistor T1, the voltage of the variable logic signal B is reduced by an amount U1 to form a signal B′ which is applied to the base of transistor T2. U1 corresponds to half the voltage swing between the voltages corresponding to signal values of logic 1 and logic 0. The reduction of the control voltage for transistor T2 by the value U1 is effected by the series-connection of a resistor R2 and a constant current source S2 furnishing a current $U1/R2$.

Emitter followers are connected to the input points A and B for delivering input signals to transistors T1 and T2. Two transistors T41 and T42 are connected ahead of input point A, these transistors receiving input signals A1 and A2, respectively, which are both applied across a resistor R3. Two further transistors T51 and T52 are connected ahead of input point B to receive inputs B1 and B2, respectively, and have the series-connection of resistor R2 and the constant current source S2 as their common emitter resistance. The circuit parameters are selected so that its output signals Q and $\overline{Q}$ are capable of directly controlling all inputs of a similar circuit.

The above-described circuit of U.S. application Ser. No. 650,300 performs the following logic functions:

$$Q=A1+A2+(\overline{B1}\cdot\overline{B2})$$
$$\overline{Q}=\overline{A1}\cdot\overline{A2}\cdot(B1+B2)$$

The plus sign here indicates, as it does in the equations following below, an "OR" function, and the multiplication sign indicates an "AND" function.

The logic circuit of FIG. 1 is particularly distinguished by its short switching times (e.g. 0.5 ns.) and short pulse front rise times (e.g. 1 ns.). FIG. 2*a* shows the logic equivalent circuit diagram for the circuit of FIG. 1.

SUMMARY OF THE INVENTION

It is a primary object of the present invention to employ such circuits for performing various types of logic operations.

A more specific object of the invention is to construct a T-flip-flop composed essentially of circuits of this type.

Another object of the invention is to produce dual counterstages composed of a plurality of circuits of this type.

Still another object of the invention is to produce frequency division circuits composed of elements of this type.

These and other objects according to the invention are achieved by the construction of a T-flip-flop composed essentially of a first logic circuit having at least one OR input, a plurality of NOR inputs, a direct function output, and a corresponding negated function output, and linkage means interconnecting the inputs and outputs, means conductively connecting the negated function output to one of the NOR inputs, an AND-circuit having two inputs and an output, which output is conductively connected to the OR input, means conductively connecting the direct function output to one of the AND-circuit inputs, and means connected to another one of the NOR inputs and to the other input of the AND-circuit for applying thereto a train of counting pulses. In accordance with the invention, the linkage means interconnecting the inputs and outputs of the logic circuit are constructed for causing a signal representing a logic 1 to appear at the direct function output whenver a signal corresponding to a logic 1 is applied to the OR input and a signal corresponding to a logic 1 to appear at the negated function output whenever a signal corresponding to a logic 1 is applied only to at least one of its NOR inputs, the signals at the outputs always being opposite to one another and the pre-existing signals at the outputs being maintained whenever the signals to all of the inputs have a value corresponding to a logic 0. In further accordance with the invention, each counting pulse has an effective duration which is shorter than the switching time of the flip-flop and the circuit operates in such a manner that an output pulse appears at the AND-circuit in response to every other counting pulse.

The present invention thus provides an inexpensive T-flip-flop which consists exclusively of logic circuits of the type disclosed in my above-mentioned prior application and which utilizes their high switching speeds and short pulse rise times. T-flip-flops are flip-flops which change their state with every input pulse, i.e., which form the modulo-2 sum of all received input pulses. They are described, for example, at page 126 of the text, Logical Design of Digital Computers, Phister (J. Wiley & Sons, New York, 1958).

The present invention thus relates to a logic circuit having OR inputs and NOR inputs. This logic circuit forms the output signal at a first output and the negated output signal at a second output by combining the OR linked input signals with the NOR linked input signals and by further linking them in an OR/NOR linkage.

This logic circuit is characterized, according to the present invention, by the following features which serve to effect its operation as a T-flip-flop: the second output is connected to one of the NOR inputs; an AND-circuit is connected ahead of one of the OR inputs; the first output is connected to the first input of the AND-circuit; a line for delivering counting pulses is connected to the second input of the AND-circuit and to a further one of the NOR inputs; and the duration of each counting pulse is made shorter than the overall switching time of the logic circuit. The flip-flop according to the present invention has the advantage of structural simplicity since it consists of essentially one of the above-described logic circuits and an AND-circuit.

If the T-flip-flop according to the present invention is used as a counting stage of a counter whose counting stages are connected together in the form of a chain (e.g. dual counters), the advantage here results that the output of the AND-circuit of one counter stage directly furnishes the input signal level required for operating the next succeeding counter stage.

According to a further feature of the present invention, the AND-circuit itself is constituted by a logic circuit of the type shown in FIG. 1. This results in the advantage, on the one hand, that the T-flip-flop according to the invention consists of identical basic structural elements and, on the other hand, that the AND-function also has the benefit of the switching speed of the logic circuit of FIG. 1.

BRIEF DESCRIPTION OF THE DRAWINGS

FIG. 1 is a circuit diagram of one embodiment of the basic logic circuit of elements according to the invention.

FIG. 2*a* is one logic representation of the circuit of FIG. 1.

FIG. 2*b* is a block circuit diagram for the logic circuit shown in FIG. 2*a*.

FIG. 3*a* shows a logic circuit according to FIG. 2*a* which is provided with a bistable behavior by means of external connections.

FIG. 3*b* is a truth table illustrating the function performed by the logic circuit according to FIG. 3*a*.

FIGS. 5*a*, 5*b* and 5*c* are pulse-time diagrams illustrating the operation of the circuit according to FIG. 4.

FIGS. 7*a*, 7*b* and 7*c* are pulse-time diagrams illustrating the operation of the circuit of FIG. 6.

DESCRIPTION OF THE PREFERRED EMBODIMENTS

In the descriptions presented below, the simplified logic circuit diagram of FIG. 2*b* is referred to instead of the complete circuit of FIG. 1. Its A-inputs will be identified as OR inputs in the following description, as indicated in FIG. 2*a*, and its B-inputs will be identified as NOR inputs, these corresponding to the relationships on which the Q output depends.

The logic circuit according to FIG. 2*b* will become bistable when its output $\overline{Q}$ is connected to one of its NOR inputs. This is shown in FIG. 3*a*. The state $Q_{t+1}$ of the circuit depends on the value of its input signals A1 and B1, assuming $A2=0$, and of its previously existing state $Q_t$ in the manner shown in the truth table of FIG. 3*b*. It should here be noted that $Q_{t+1}$ equals 1 whenever $A=1$.

By connecting further emitter follower input transistors at points A and B in the logic circuit of FIG. 1, the number of OR inputs and the number of NOR inputs can be increased. The description to follow refers to such a logic circuit provided with three OR inputs and three NOR inputs.

Figure 4:
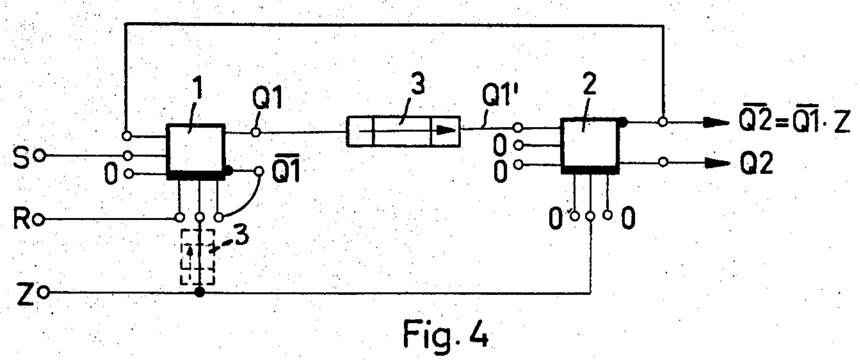
FIG. 4 is a logic circuit representation of a T-flip-flop according to the present invention which is controlled by counter signals.

The circuit shown in FIG. 4 consists of two such logic circuits 1 and 2 each having three OR and three NOR inputs and connected in the forward direction via a delay element 3. The logic circuit 1 is connected as shown in FIG. 3*a* and thus exhibits a bistable behavior conforming to the table of FIG. 3*b*. Its output Q1 is connected, via the delay element 3, to one OR input of the logic circuit 2.

Counting pulses Z are delivered to one NOR input each of the logic circuits 1 and 2. Two further input lines S (set) and R (reset) are provided. A pulse having an amplitude corresponding to a logic 1 fed via line S brings the logic circuit 1 into the state $Q1=1$, while a pulse of the same amplitude delivered over line R at a different instant resets circuit 1 to the state $Q1=0$. A voltage corresponding to a logic 0 is applied to the remaining inputs of both logic circuits.

The logic circuit 2 operates as an AND-circuit with respect to its output $\overline{Q2}$ at which appears the conjunction $\overline{Q2}=\overline{Q1}\cdot Z$. This conjunction signal is applied to one OR input of logic circuit 1.

If, at the time a signal $Z=1$ appears, the logic circuit 1 is in the state $Q1=1$, it will follow that circuit 2 will be placed in the state $\overline{Q2}=0\cdot 1=0$. Logic circuit 1 thus receives a 0 at its OR input connected to $\overline{Q2}$ and a 1 at its NOR input connected to line Z, so that, assuming $S=0$, it changes to the state $Q1=0$ and $\overline{Q1}=1$ in accordance with the logic function set forth in FIG. 3*b*.

If a counting pulse $Z=1$ occurs when the logic circuit 1 is in the state $Q1=0$, logic circuit 2 will emit a signal $\overline{Q2}=1\cdot 1=1$, causing logic circuit 1 to switch from the state $Q1=0$ to the state $Q1=1$.

The circuit of FIG. 4 thus changes its state after every counting pulse $Z=1$ and thus exhibits the desired T-flip-flop behavior. Moreover, signal $\overline{Q2}=1$ appears only during every other counting pulse $Z=1$. It can therefore be used as the input signal for a similar circuit, e.g. in a frequency divider converter or in a dual counter.

The duration of each counting pulse Z is predetermined. The duration of the signal $\overline{Q2}=\overline{Q1}=\cdot Z$ is thus also predetermined. Consequently, $\overline{Q2}$ will automatically have the correct chronological dimension for operating a subsequent T-flip-flop of identical construction.

FIG. 5 shows various voltage waveforms occurring at various points in the circuit according to FIG. 4, FIG. 5*a* shows a train of counting pulses Z, here shown as triangular pulses. In FIG. 5*b* the solid line shows the waveform of Q1 as a function of Z and the broken line the output signal Q1′ from the delay element 3, which output signal is delayed by a time fixed $\Delta$ with respect to Q1. FIG. 5*c* shows the waveforms of the output signals Q2 and $\overline{Q2}$ of logic circuit 2.

To understand the operation of the circuit it must first be appreciated that the logic circuits employed possess a threshold value characteristic due to their sum-and-difference-amplifier type construction, i.e., they employ transistors T1 and T2 arranged in the manner shown in FIG. 1. Thus, an input signal whose value increases progressively from logic 0 to logic 1 is sensed by the circuit as a logic 1 only when it has progressed to, or beyond, one-half the variation between the logic 0 and logic 1 values. The same applies for those cases when the input changes progressively in the opposite direction.

This threshold voltage characteristic causes, as seen in FIGS. 5*a* and 5*b*, the logic circuit to exhibit a delay of $\Delta$ between the input signal and the output signal so that only when the first counting pulse Z has exceeded half its peak value will Q1 begin to switch from 1 to 0.

FIGS. 5*a*–5*c* also illustrate the function of the delay element 3 of FIG. 4. If the delay element were not present, Q1 would reach its respective OR input of logic circuit 2 as soon as it appears at the output of circuit 1.

At a time $t_1$, Q1 has reached a value midway between 1 and 0 and, correspondingly, $\overline{Q1}$ between 0 and 1. However, Z remains at an effective value of 1, i.e., it remains greater than one-half its peak value, up to time $t_2$, so that for the interval $t_2$–$t_1$ the following would be true: $\overline{Q2}=\overline{Q1}\cdot Z=1$. As a result, the output $\overline{Q2}$ a pulse would appear and would increase progressively from $t_1$ *to* $t_2$, until reaching a value equal to one-half the peak amplitude of the logic circuit output signals. Such a pulse is shown in FIG. 5*c* with crosshatching. However, since at this time $\overline{Q2}$ should remain at a value of logic 0, this would represent an interfering pulse which would act on the corresponding OR input of logic circuit 1 and would prevent, under certain circumstances, Q1 of logic circuit 1 from being switched from 1 to 0 when $Z=1$. If Q1 is delayed by Δ; the above-mentioned interfering pulse cannot occur since now the conjunction $\overline{Q1}\cdot Z=1$ will not occur during the time interval $t_2$–$t_1$.

The delay element can also be connected into the line linking logic circuit 1 with line Z.

While the first counting pulse Z effects a switch of the logic circuit 1 from $\overline{Q1}=1$ to 0, the second counting pulse cooperates with a signal $\overline{Q2}=1$ to reset the logic circuit 1 to $Q1=1$, immediately prior to which $\overline{Q1}=1$. The third counting pulse again effects a change in the state of the logic circuit 1, but does not generate an output pulse $\overline{Q2}$, and the fourth counting pulse again effects a change of Q1 and produces an output signal $\overline{Q2}=1$.

FIG. 5 also shows the maximum permissible duration of the counting pulses Z. Its mean width, measured at the midpoint between the 0 and 1 logic value levels must not be greater than 2Δ.

FIGS. 5*a* and 5*c* further show that the trailing edge of $\overline{Q2}$ is always delayed by the time Δ with respect to the trailing edge of Z. Thus, when Q1 is switching from 0 to 1, the OR input of logic circuit 1 is always more positive during the disappearance of Z than its NOR input connected to line Z. Therefore, at these moments, $Q_{t+1}$ of the FIG. 3*b* table can move from its state corresponding to line 4 of that table to the state of line 1 only by passing through the state of line 3 so that it is assured that $Q_{t+1}$ always assumes the correct value 1, which is due to the priority of input A1 over input B1.

FIG. 6 again shows a modified version of the circuit of FIG. 4 wherein the logic circuit 2 is not controlled by counting pulses Z but by the negated counting pulses which are applied to one of its OR inputs, all of the NOR inputs of circuit 2 receiving a signal representing a logic 1. This method of control has the advantage that, due to the internal switching conditions of the logic circuit employed, the controlling signal is amplified and shaped. A further advantage is that now the generator for the counting pulses Z is loaded by only one circuit input.

Figure 6:
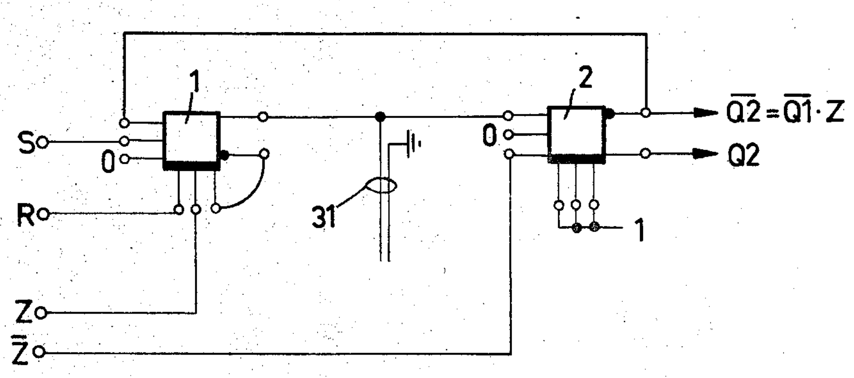
FIG. 6 is a logic circuit representation of a modified form of construction of the T-flip-flop of FIG. 4.

FIG. 6 further shows a preferred embodiment of the delay element 3. This element is here constituted by an open circuited stub line 31 which causes the output signal Q1 of logic circuit 1 to be delayed by the time Δ relating to a level corresponding to its mean value during each switch from logic 0 to 1 and vice versa.

The inputs of the logic circuits employed have relatively high resistances, e.g. at $10^9$ Hz. they have a capacitive impedance of 500 ohms, whereas the line 31 has, for example, a characteristic impedance of 50 to 100 ohms. It is thus possible to connect the input of a logic element according to FIG. 2 to such a circuit without producing an adverse effect on the above-described delay function, e.g. for the purpose of further utilizing the output Q1 of the T-flip-flop.

The operation of the circuit of FIG. 6 is illustrated in the waveform diagrams of FIG. 7. FIG. 7*a* shows the waveforms of the counting pulses Z and $\overline{Z}$, FIG. 7*b* the waveform of Q1 in dependence on the counting pulse Z and FIG. 7*c* the waveform of $\overline{Q2}$.

It has already been mentioned above that the T-flip-flops according to the present invention, and according to FIGS. 4 and 6 are particularly well suited for use as stages in multistage chain-type sequential circuits, as for example frequency dividers (dividing ratio 1:2 per stage) or dual counters, since they emit an output signal $\overline{Q2}=1$ after every second counting pulse, here constituting input pulses, which signal can be used as an input for controlling the next succeeding T-flip-flop connected in the chain.

Figure 8:
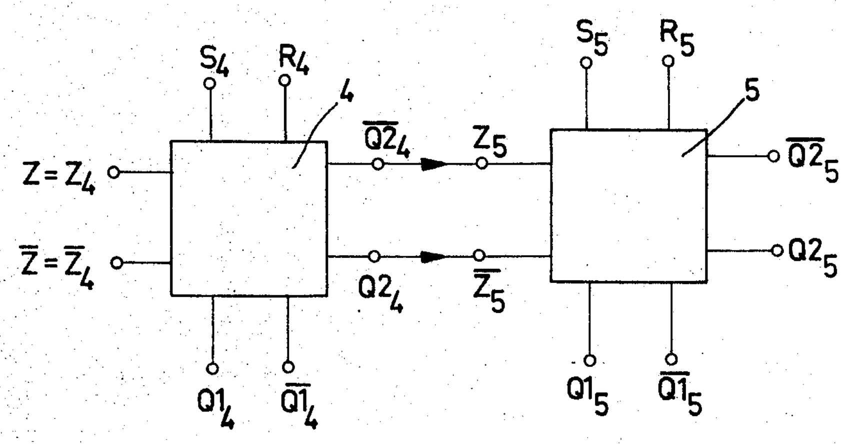
FIG. 8 is a logic circuit representation of a two-stage dual counter according to the invention consisting of T-flip-flops of the type shown in FIG. 6.

A two-stage dual counter consisting of two T-flip-flops 4 and 5 according to the present invention is shown in FIG. 8. The two T-flip-flops, which are shown in block circuit diagram form, correspond to those of FIG. 6. Each one of these flip-flops thus has two counter inputs Z and $\overline{Z}$, one set input S and one reset input R, two outputs Q1 and $\overline{Q1}$ indicating the existing flip-flop contents as well as two outputs $\overline{Q2}$ and Q2 emitting the stepping pulse and the negated stepping pulse for the next stage.

The pulse time diagram of FIGS. 5 and 7 are applicable under the condition that outputs $\overline{Q2}$ and Q2 are not subjected to any further capacitive load. An additional capacitive load does exist, however, when, as can be seen in FIG. 8, the outputs $\overline{Q2}$ and Q2 of a stage are applied to the next-following stage. In this case the wavefront rise time of $\overline{Q2}$ becomes longer. On the other hand, the time for the creation of this signal is determined by the duration of the counting pulses Z in the first stage, or the input pulses to succeeding stages, so that the output pulse $\overline{Q2}$ can no longer rise to its maximum final value. Since this process continues through all stages of the counter, the output signal $\overline{Q2}_i$ of some *i*th stage will no longer suffice to control an $(i+1)$th stage. The output pulse $\overline{Q2}_i$ of the *i*th stage must thus be subjected to a suitable modification.

This can be achieved in a simple manner by the connection of an intermediate logic circuit of the type shown in FIG. 2 between the stages in question, the output $\overline{Q2}_i$ being connected to a NOR input, (e.g. B1) and the output $Q2_i$ to an OR input (e.g. A1) of the intermediate logic circuit. The signal $\overline{Q2}_i$, and correspondingly $Q2_i$, are lengthened by this procedure by an amount equal to one-half a pulse rise time, e.g. by a nanosecond, and thus again reach the full amplitude associated with a logic 1.

Since the T-flip-flop according to FIG. 4 places twice the load on the source furnishing the counting pulses Z as does the T-flip-flop according to FIG. 6, while not requiring an inverted counting pulse $\overline{Z}$, it is advisable, when employing a low-resistance counting pulse source for the counting chain of FIG. 8, to utilize a T-flip-flop according to FIG. 4 as the first stage and T-flip-flops according to FIG. 6 for all further stages.

It will be understood that the above description of the present invention is susceptible to various modifications, changes, and adaptations.

I claim:

1. A T-flip-flop comprising, in combination:

(a) a first logic circuit having at least one OR input, a plurality of NOR inputs, a direct function output, a corresponding negated function output, and linkage means interconnecting said inputs and said outputs for causing a signal representing a logic 1 to appear at said direct function output whenever a signal corresponding to a logic 1 is applied to said OR input and a signal corresponding to a logic 1 to appear at said negated function output whenever a signal corresponding to a logic 1 is applied only to at least one of its NOR inputs, the signals at said outputs always being opposite to one another and the pre-existing signals at said outputs being maintained whenever the signals to all of said inputs have a value corresponding to a logic 0;

(b) means conductively connecting said negated function output to one of said NOR inputs;

(c) an AND-circuit having two inputs and an output, which output is conductively connected to said OR input;

(d) means conductively connecting said direct function output to one of said AND-circuit inputs;

(e) and means connected to another one of said NOR inputs and to the other input of said AND-circuit for applying thereto a train of counting pulses, each pulse having an effective duration which is shorter than the switching time of said flip-flop;

(f) whereby an output pulse appears at said AND-circuit output in response to every other counting pulse.

2. An arrangement as defined in claim 1 wherein said AND-circuit comprises a second logic circuit having an OR input constituting said one AND-circuit input, a NOR input constituting said other AND-circuit input, a negated output constituting said AND-circuit output, and a direct output presenting a signal which is opposite from that appearing at said negated output.

3. An arrangemnet as defined in claim 1 wherein said AND-circuit comprises a second logic circuit having a plurality of OR inputs each of which constitutes one of said AND-circuit inputs, at least one NOR input, one negated output constituting said AND-circuit output, and one direct output at which appears a signal which is opposite from that appearing at said negated output, said means for applying a train of counting pulses includes two conductors one of which provides counting pulses of a first polarity and the other of which provides counting pulses of the opposite polarity, said one conductor being connected to said other NOR input of said first logic circuit and said other conductor being connected to said other input of said AND-circuit, said arrangement further comprising means connected to said NOR input of said second logic circuit for applying thereto a signal having a value corresponding to a logic 1.

4. A multistage counter comprising a plurality of stages each constituted by a flip-flop as defined in claim 3 wherein, for each stage after the first, said one conductor has its input end connected to said negated output of said second logic circuit of the preceding stage and said other conductor has its input end connected to said direct output of said second logic circuit of said preceding stage so that the outputs of each stage constitute the counting pulses for the next preceding stage, and wherein, to compensate for progressive decreases in the output pulse amplitude or duration from one stage to the next, said counter further comprises an additional logic circuit connected between the output of an intermediate stage whose output pulses are ineffective and the next succeeding stage, said additional circuit including: an OR input connected to said direct output of said second logic circuit of said intermediate stage; a NOR input connected to said negated output of said second logic circuit of said intermediate stage; a negated output connected to said one conductor of said next succeeding stage; a direct output connected to said other conductor of said next succeeding stage; and linkage means interconnecting said additional circuit inputs and outputs for causing a signal representing a logic 1 to appear at its said direct output whenever a signal corresponding to a logic 1 is applied to its said OR input and for causing a signal representing a logic 1 to appear at its said negated output whenever a signal representing a logic 1 is applied only to its said NOR input.

5. An arrangemnet as defined in claim 1 further comprising a delay element connected between said other one of said NOR inputs and said means for applying a train of counting pulses for delaying such counting pulses by a time interval corresponding to one-half the pulse rise time of the output signals from said flip-flop.

6. An arrangemnet as defined in claim 1 further comprising a delay element connected in series between said direct function output of said logic circuit and said one of said AND-circuit inputs for delaying the signals from said direct function output by an amount equal to one-half the pulse rise time of such signals.

7. A multistage counter comprising a plurality of stages each constituted by a flip-flop as defined in claim 1, wherein, for each stage after the first, said means for applying a train of counting pulses are connected to said AND-circuit output of the preceding stage for receiving the signals appearing at said preceding stage AND-circuit output as its train of counting pulses.

References Cited

UNITED STATES PATENTS

| | | | |
|---|---|---|---|
| 3,284,645 | 11/1966 | Eichelberger et al. | 307—289X |
| 3,417,265 | 12/1968 | Lee IV | 307—247 |
| 3,467,839 | 9/1969 | Miller | 307—289 |
| 3,484,625 | 12/1969 | Booher | 307—289 |

JOHN S. HEYMAN, Primary Examiner

U.S. Cl. X.R.

328—41; 307—215, 247, 289